United States Patent [19]
Nilssen

[11] Patent Number: 5,428,264
[45] Date of Patent: Jun. 27, 1995

[54] ELECTRONIC BALLAST WITH CONTROLLED OPERATING VOLTAGE

[76] Inventor: Ole K. Nilssen, 408 Caesar Dr., Barrington, Ill. 60010

[21] Appl. No.: 15,584

[22] Filed: Feb. 10, 1993

Related U.S. Application Data

[63] Continuation of Ser. No. 772,547, Oct. 4, 1991, which is a continuation of Ser. No. 346,321, May 1, 1989, abandoned, which is a continuation of Ser. No. 686,275, Dec. 26, 1984, abandoned, which is a continuation-in-part of Ser. No. 677,562, Dec. 3, 1984, Pat. No. 4,698,553, which is a continuation-in-part of Ser. No. 456,276, Feb. 22, 1983, Pat. No. 4,503,363.

[51] Int. Cl.$^6$ .............................................. H05B 37/02
[52] U.S. Cl. .................................... 315/127; 315/125; 315/119; 315/225; 315/242; 315/243; 315/244; 315/284; 315/DIG. 7
[58] Field of Search ................ 315/244, 242, 127, 125, 315/119, 225, DIG. 7, 243, 284

[56] References Cited

U.S. PATENT DOCUMENTS

| | | | |
|---|---|---|---|
| 3,662,216 | 5/1972 | Hildebrant | 315/284 X |
| 4,370,600 | 1/1983 | Zansky | 315/243 X |
| 4,612,478 | 9/1986 | Payne | 315/244 X |

Primary Examiner—Robert J. Pascal
Assistant Examiner—Reginald A. Ratliff

[57] ABSTRACT

In a fluorescent lamp ballast, a high-frequency AC voltage is applied directly across a tuned L-C circuit. The fluorescent lamp is connected in parallel with the capacitor of the L-C circuit and a voltage-limiting means prevents the series-resonating L-C circuit from overloading the source of AC voltage during any period when the lamp is not effective in providing circuit loading. When power is initially applied to the L-C circuit, a control means provides a short circuit across the capacitor; and, by way of a first current transformer, the resulting short circuit current is used for pre-heating the fluorescent lamp cathodes. After about 1.5 second, the control means provides for removal of the short circuit for a period of about 25 milli-seconds, thereby permitting the voltage across the capacitor to grow to a magnitude sufficient to ignite and operate the lamp, while at the same time removing the cathode voltage. If the lamp ignites, the resulting lamp current is then used, by way of a second current transformer, to prevent the control means from re-providing the short circuit. If lamp current does not flow, or if it at any time ceases to flow, the control means will re-provide the short circuit within about 25 milli-second. Thereafter, until power is removed or until an operable lamp is connected, the control means will continuously repeat the cycle of 1.5 second short circuit and 25 milli-seconds open circuit.

2 Claims, 1 Drawing Sheet

ELECTRONIC BALLAST WITH CONTROLLED OPERATING VOLTAGE

BACKGROUND OF THE INVENTION

This is a continuation of Ser. No. 07/772,547 filed Oct. 4, 1991; which is a Continuation of Ser. No. 346,321 now abandoned filed May 1, 1989; which is a continuation of Serial No. 06/686,275, filed Dec. 26, 1984, abandoned; which is a Continuation-in-Part of Ser. No. 677,562 filed Dec. 3, 1984, U.S. Pat. No. 4,698,553, as well as of Ser. No. 456,276 filed Feb. 22, 1983, U.S. Pat. No. 4,503,363.

RELATED PATENTS

The following U.S. Patents (all of which are owned by Ole K. Nilssen) include subject matter related to the present application: U.S. Pat. Nos. 4,893,059; 4,926,096; 4,928,039; 4,935,669; 4,943,884; 4,954,754; 4,983,887; 5,004,955; 5,015,923; 5,039,919; 5,047,698; 5,049,787; 5,103,139; 5,111,380; 5,177,409; 5,179,326; 5,185,560; 5,191,262; and 5,214,356.

FIELD OF INVENTION

The present invention relates to high-frequency series-resonant ballasts for fluorescent lamps.

PRIOR ART AND BACKGROUND CONSIDERATIONS

High-frequency series-resonant fluorescent lamp ballasts have been previously described, such as in U.S. Pat. Nos. 3,710,177 to Ward and 4,370,600 to Zansky. However, these previously described ballasts do not provide solutions to several basic problems associated with practical applications of such ballasts. These problems relate to the excessive power drain by and the self-destructive nature of the series-resonant ballast under the condition of being connected to an inoperative lamp.

In powering a fluorescent lamp by way of a high-frequency series-resonant ballast, where the ballast constitutes a high-Q resonant L-C circuit series-excited from an AC voltage source and parallel-loaded by the fluorescent lamp, there is a serious problem associated with the situation where the fluorescent lamp for one reason or another ceases to constitute an effective load for this high-Q series-excited L-C circuit. In such a situation, which is most apt to occur toward the end of normal lamp life, the power drawn by the high-Q resonant L-C circuit from its AC voltage source is so excessively high as to cause damage to or even destruction of the L-C circuit and/or the AC voltage source. If, contrary to expectations, destruction of the circuit and/or the source does not occur, the amount of power drawn from the source will be so large as to represent an unacceptable level of energy waste—recognizing that it may often take a long time before a worn-out fluorescent lamp is replaced.

SUMMARY OF THE INVENTION

Objects of the Invention

An object of instant invention is that of providing safe and efficient high-frequency series-resonant ballasts for fluorescent lamps. Other objects and advantages of the present invention will become apparent from the following description.

Brief Description

An L-C circuit with an unloaded Q-factor of about 50 is series-connected directly across the output of a 100 Volt/30 kHz voltage source. This L-C circuit is resonant at 30 kHz, which means that it is series-resonant at the very frequency of the high-frequency voltage source.

A regular 40 Watt fluorescent lamp and a voltage-limiting means are both connected in parallel with the tank-capacitor of the L-C circuit, the voltage-limiting means being operative to limit the voltage developed across the tank-capacitor to a magnitude suitable for proper lamp starting, which magnitude is about 300 Volt.

Without the voltage-limiting means, with an unloaded Q-factor of 50 and linear circuit operation, the magnitude of the voltage developing across the tank-capacitor would have been 5000 Volt.

Under normal operation, the fluorescent lamp limits the magnitude of the voltage developing across the tank-capacitor to about 100 Volt; and at that point the loaded L-C circuit draws approximately 40 Watt of power from the source. Thus, with a loaded Q-factor of about unity and an unloaded Q-factor of 50, the implication is that the losses in the L-C circuit amount to about 2% of the total power drawn from the source under normal operating conditions.

If for some reason the fluorescent lamp should fail to constitute an effective load for the L-C circuit, the magnitude of the voltage across the tank-capacitor would increase to about 300 Volt, which implies that the power drawn from the source at that point would be about 120 Watt, with substantially all of it being dissipated in the voltage-limiting means.

If there were no voltage-limiting means present, however, the power drawn by the L-C circuit from the source—assuming no breakdown—would be about 2000 Watt, with all of it being dissipated within the L-C circuit itself.

The present invention provides for means to prevent the L-C circuit from operating in its resonant mode—and thereby to prevent it from drawing excessive power—in case the fluorescent lamp should fail even for a brief period to constitute a proper load for the L-C circuit. This effect is accomplished by a transistor operative, by way of a rectifier bridge, to provide a short circuit across the tank-capacitor whenever lamp current fails to flow for about 25 milli-seconds. With a short-circuited tank-capacitor, the amount of power drawn by the L-C circuit is negligibly small.

More particularly, a control means is connected with the the L-C circuit and is operative to provide for the following functions.

a) Upon initially providing power to the L-C circuit, the control means provides for a short circuit across the tank-capacitor for an initial period of about 1.5 second; which is the length of time normally required for the cathodes of the fluorescent lamp to become fully thermionic.

b) After this initial period, the control means removes the short ciruit for a period of about 25 milli-seconds; which period is long enough to provide for proper lamp starting under normal circumstances.

c) If lamp current starts to flow within this initial period, the control means operates to keep the short circuit removed for as long as lamp current flows.

d) If lamp current fails to flow within this initial period, the control means re-imposes the short circuit and keeps it so imposed for a period of about 1.5 second; whereafter it again removes the short circuit for a period of about 25 milli-seconds.

e) It the fluorescent lamp is removed from the L-C circuit, or if for other reasons it fails to continue to operate, the control means operates to provide a short circuit across the tank-capacitor within a period of about 25 milli-seconds.

f) As long as there is no lamp loading the L-C circuit, the control means tries every 1.5 second or so to start the lamp by removing the short circuit for a period of about 25 milli-seconds. Thus, with a duty-cycle of about 25 milli-seconds out of 1500 milli-seconds (1.67%), the average power dissipation of the unloaded L-C circuit will be only about 2.0 Watt.

DESCRIPTION OF THE PREFERRED EMBODIMENT

Details of Construction

Figure 1:
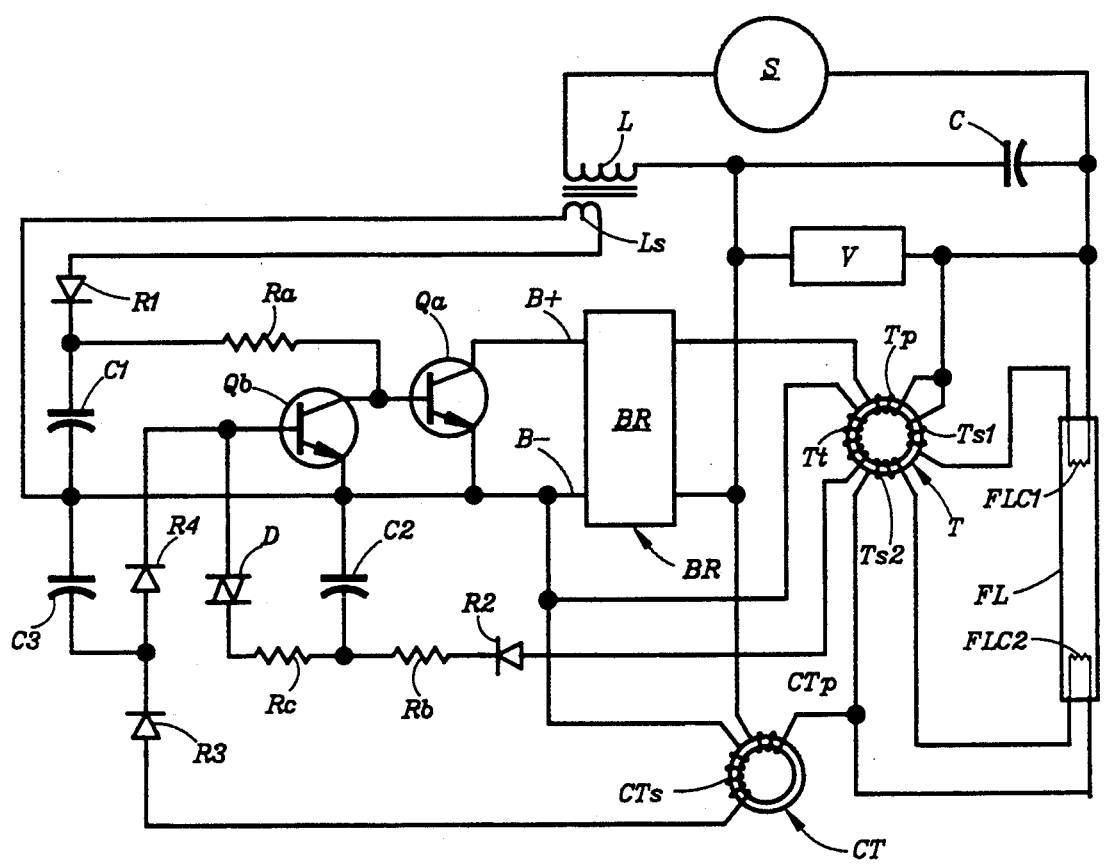
FIG. 1 provides a schematic circuit diagram of the preferred embodiment of the invention.

FIG. 1 shows an AC voltage source S, which in reality is a power-line-operated frequency converter providing an output voltage of 100 Volt RMS magnitude and 30 kHz frequency.

Connected directly across S is a series-combination of an inductor L and a capacitor C. Inductor L has a tightly coupled secondary winding Ls.

A Varistor V is connected directly across capacitor C.

A fluorescent lamp FL, having cathodes FLC1 and FLC2, is connected in series with the primary winding CTp of control transformer CT, and this series-combination of FL and CTp is connected across capacitor C.

A bridge rectifier BR, having a B+ output bus terminal and a B− output bus terminal, is connected in series with the primary winding Tp of transformer T, and this series-combination of BR and Tp is connected across capacitor C.

A transistor Qa is connected with its collector to the B+ bus and with its emitter to the B− bus.

A series-combination of a capacitor C1 and a rectifier R1, with R1 being connected with the capacitor by way of its cathode, is connected directly across the output of secondary winding Ls of inductor L. The cathode of rectifier R1 is connected to the base of transistor Qa by way of a resistor Ra.

A transistor Qb is connected with its collector and emitter to the base and emitter, respectively, of transistor Qa.

Transformer T has a first secondary winding Ts1 connected with cathode FLC1 of fluorescent lamp FL, and a second secondary winding Ts2 connected with fluorescent lamp cathode FLC2.

Transformer T also has a tertiary winding Tt, which tertiary winding is connected between the B− bus and the anode of a rectifier R2.

A series-combination of a resistor Rb and a capacitor C2 is connected between the cathode of rectifier R2 and the B− bus, with one terminal of resistor Rb being connected with the cathode of R2.

A series-combination of a resistor Rc and a Diac D is connected between the base of transistor Qb and the junction between resistor Rb and capacitor C2.

Control transformer CT has a secondary winding CTs connected between the B− bus and the anode of a rectifier R3. A rectifier R4 is connected between the cathode of rectifier R3 and the base of transistor Qb, the anode of rectifier R4 being connected with the cathode of rectifier R3.

A capacitor C3 is connected between the cathode of rectifier R3 and the B− bus.

Details of Operation

In FIG. 1, when the 100 Volt/30 kHz voltage from source S is initially applied to the L-C series-circuit, a voltage is developed across secondary winding Ls. This voltage is rectified and filtered by rectifier R1 and capacitor C1, and then applied to the base of transistor Qa by way of a current-limiting resistor Ra. The value of Ra is so chosen that the resulting DC current provided to the base of transistor Qa is adequate to make this transistor conduct in a substantially saturated mode and thereby to constitute an effective short circuit between the B+ bus and the B− bus. With transistor Qa so conducting, and since transformer T is a current transformer with a very low-impedance primary winding, and since a short circuit at the output of the bridge rectifier is essentially equivalent to a short circuit at its input, there is in effect a short circuit provided across tank-capacitor C. Thus, as long as transistor Qa is an effective short circuit, the magnitude of the current drawn from the source is limited by the reactance of L, thereby in effect representing a non-dissipative load.

As long as transistor Qa conducts, current is forced through the primary winding Tp of transformer T. By transformer action, this current is provided to the effective parallel connection of the two fluorescent lamp cathodes, thereby providing to these cathodes the modest amount of power required to bring about thermionic emission. The tertiary winding Tt provides a voltage output that is used for charging capacitor C2 with a current that is limited by resistor Rb. Eventually, the magnitude of the voltage on C2 gets to be high enough to cause Diac D to break down, at which point the charge that had accumulated on capacitor C2 gets discharged into the base of transistor Qb—with the magnitude of the discharge current being principally determined by the resistance of Rc. This magnitude is so chosen that—as soon as the Diac breaks down—transistor Qb becomes conductive to the point of shunting away the base current provided to transistor Qa by way of resistor Ra.

In other words, as soon as the voltage on capacitor C2 has increased to some pre-determined magnitude, the Diac breaks down and immediately renders transistor Qa non-conductive. The time it takes for the voltage on capacitor C2 to reach this predetermined magnitude is a function of the time-constant associated with C2 and Rb as well as of the magnitude of the voltage being provided by the tertiary winding Tt. In the circuit of FIG. 1, this time was chosen to be about 1.5 second; which is the length of time normally required by fluorescent lamp cathodes to reach the point of thermionic emission.

For as long as capacitor C2 is providing base current for transistor Qb, this transistor is operative to prevent current from being applied to the base of transistor Qa, thereby making Qa non-conductive. The length of time during which Qa is thereby kept non-conductive is determined by the parameters of capacitor C2 and resistor Rc. In the circuit of FIG. 1, these parameters were so chosen as to make this length of time about 25 milli-seconds.

Thus, after the initial period of about 1.5 second, during which Qa represented a short circuit and the fluorescent lamp cathodes were provided with heating power, Qa is switched off and becomes an open circuit for about 25 milli-seconds. During this 25 milli-second period, the voltage across capacitor C increases in magnitude to the point where the lamp starts. With already pre-heated cathodes, the time required for the lamp to start is normally less than 25 milli-seconds.

As soon as lamp current starts to flow, control transformer CT, by way of rectifier R3 and filter capacitor C3, provides a DC current to the base of transistor Qb, thereby causing transistor Qb to continue to shunt away the base current for Qa. Thus, as long as the lamp starts to draw current within the 25 milli-second period, transistor Qa will continue to be non-conductive, and the lamp will continue to operate.

However, if lamp current does not start to flow within the 25 milli-second period, base current for Qb will cease, which means that Qb will cease shunting away the base current for Qa. Thus, after about 25 milli-seconds, if lamp current fails to flow, transistor Qa will again become conductive and operative to provide a short circuit across capacitor C.

Now, with Qa conductive, current will again flow through the primary winding Tp of transformer P, and again will charge C2 to the point of breaking down the Diac; which then again starts a 25 milli-second period of shunting away the base current for transistor Qa.

In other words, with the fluorescent lamp inoperative or disconnected, the circuit of FIG. 1 operates in a cyclical fashion, with each cycle consisting of a 1.5 second period during which transistor Qa is conductive—which implies that capacitor C is shorted—and a 25 milli-second period during which transistor Qa is non-conductive. With the lamp operating, on the other hand, this cyclical circuit operation is prevented by the flow of lamp current.

The lamp cathodes are supplied with heating power only as long as Qa conducts. After the lamp has ignited, however, heating power is no longer needed and is no longer supplied, thereby providing for noticably improved lamp efficacy.

It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. In a ballast for a gas discharge lamp; the lamp having a pair of lamp terminals; the ballast having a pair of output terminals; a high-frequency output voltage being provided between the output terminals; the high-frequency output voltage being of frequency distinctly higher than that of the power line voltage on an ordinary electric utility power line;

the improvement comprising:

circuitry operative: (i) before connecting the lamp terminals with the output terminals, to cause the high-frequency output voltage to be amplitude-modulated at a frequency lower than that of the power line voltage; and (ii) after having connected the lamp terminals with the output terminals and after the gas discharge lamp has ignited, to cause the high-frequency output voltage to cease to be amplitude-modulated at said frequency lower than the frequency of the power line voltage.

2. The improvement of claim 1 wherein: (i) prior to the lamp terminals being connected with the output terminals, the high-frequency output voltage is characterized by having an RMS magnitude that varies periodically, at a frequency lower than 60 Hz, between a maximum level and a minimum level; and (ii) the minimum level being lower than half the maximum level.

* * * * *